Figure 1:
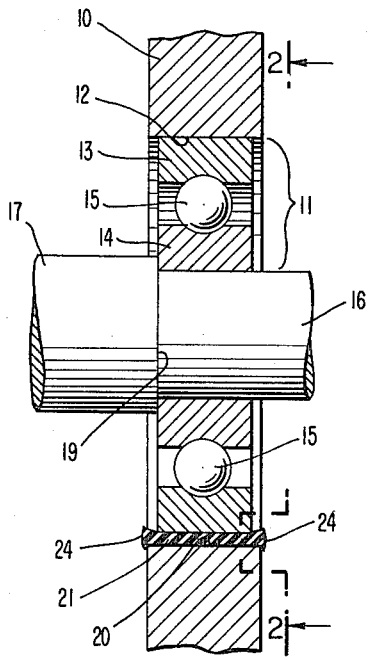

Feb. 9, 1965 A. H. RYON 3,169,040

BEARING

Filed April 1, 1963

INVENTOR.
ADELBERT H. RYON
BY Bauer and Seymour
ATTORNEYS

United States Patent Office 3,169,040
Patented Feb. 9, 1965

3,169,040
BEARING
Adelbert H. Ryon, Sidney, N.Y., assignor to The Bendix Corporation, Sidney, N.Y., a corporation of Delaware
Filed Apr. 1, 1963, Ser. No. 269,241
6 Claims. (Cl. 308—236)

This invention relates to bearings and more particularly to mounting means for bearings adapted for supporting rotating parts.

In many installations employing bearings, such as sleeve journal bearings, roller, or ball bearings, the bearings are mounted so that the bearing is free to move axially relative to its support, relative to the rotatable element carried by the bearing, or both. This gives the parts freedom to move somewhat axially as required either by their initial manufacturing tolerances or by conditions arising during operation of the bearing. It is highly desirable that the bearing, or a part of the bearing in the case of those bearings employing inner and outer races, shall not rotate with respect to the part of the apparatus to which it is designed to be fixed against rotation. If it does so rotate, not only is the purpose of the bearing defeated, but undesirable wear and heating of the apparatus will result.

Mechanisms have been previously proposed and used for restraining from rotation a bearing or a part of a bearing which is mounted for limited axial freedom of movement with respect to its associated element such as a support or shaft. One such mechanism is shown in the patent to Knudson, No. 2,650,866, which is assigned to the present assignee. Such prior mechanism, however, requires either the substantial enlargement of the opening in the support to receive the bearing and the means for preventing the outer race of the bearing from rotation, or a substantial decrease in the diameter of the shaft supported by the bearing to permit the use of means interposed between the shaft and the inner race of the bearing to prevent their relative rotation. Both of such mechanisms require the provision of an annular groove in a part of the combination, in the first case the support being thus grooved and in the second case the shaft being grooved.

It is among the objects of the present invention to provide a novel mechanism for preventing relative rotation between a bearing or a part of a bearing and an associated element, the bearing being left free for limited axial movement.

A further object of the invention is the provision of a mechanism of the character indicated which is simple, economical, effective, and readily installed.

Yet another object is the provision of such mechanism which does not require the enlarging of the bearing receiving opening in the support, does not require a reduction in size of the shaft supported in the bearing, does not require any grooving of the opening in the support and/or the shaft, and which may readily be installed by the use of simple tools in either old or new apparatus.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

Figure 2:
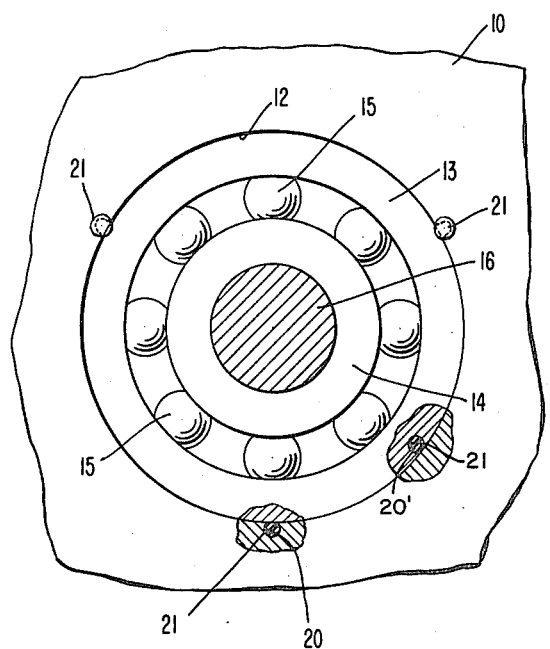
Figure 3:
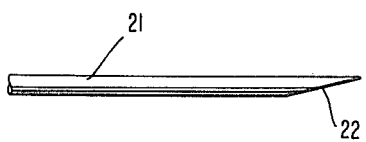

In the drawings, wherein like reference characters refer to like parts throughout the several views, FIG. 1 is a view in vertical axial section through the combination of a portion of a support, a ball bearing mounted therein, and a shaft supported in the bearing, the combination including a mechanism in accordance with the invention, certain of the parts being shown in elevation;

FIG. 2 is a view primarily in end elevation in the direction from right to left of the combination of FIG. 1, a portion of the figure being shown in vertical section taken along the line 2—2 of FIG. 1; and FIG. 3 is a view in elevation of one of the elements of the bearing retaining means of the invention prior to its installation in a combination such as that of FIGS. 1 and 2.

In FIGS. 1 and 2 there is shown a support 10 which may be, for example, the frame of an apparatus. A ball bearing 11 is mounted in a bore 12 in support 10, the outer race 13 of the bearing fitting accurately within bore 12 but having freedom of axial movement with respect thereto. Bearing 11 has an inner race 14, between which and the outer race are interposed a plurality of balls 15. The inner race 14 is press fitted upon a reduced diameter portion 16 of a shaft 17 and in abutment with an annular shoulder 19 on the shaft. The described axial freedom of motion of the outer race 13 in the bore 12 in support 10 permits the expansion of shaft 17, assuming that its left hand end (not shown) is rotatably held by a bearing against axial movement, without damage to either bearing.

The mechanism for holding the outer race 13 of bearing 11 from rotation in bore 12 is shown in FIG. 2, one element of such mechanism being shown near the bottom of FIG. 1. Angularly spaced around bore 12, preferably at equal angles, are a plurality of passages 20, shown as bores, of relatively small diameter, such bores being parallel to the axis of bore 12 and lying predominantly in support 10 but breaking through the surface of bore 12, the arc of the break through such surface subtending a small angle in bore 12 and an angle on the order of 45° to 180° in bore 20. Thus, the bores 20 are in direct communication with the zones of the outer surface of race 13 which confront the respective bores.

Mounted in each of bores 20 is a rod-like element 21 of elastomeric incompressible material having a high coefficient of friction such as rubber, neoprene, or the like. The elements 21 have a relaxed diameter somewhat exceeding the effective diameter of the bores 20, but may be stretched to assume a diameter smaller than that of the bores.

The elements 21 may be installed in the combination shown by cutting one end of a length of such element at an acute angle, to provide a pointed end 22 as shown in FIG. 3. The end 22 is then introduced into one end of a bore 20, being engaged and gripped from the other end of the bore by a tool such as needlenosed pliers inserted therein. The element 21 may then be stretched and pulled to lie within the full length of the bore 20, after which its ends are released so that it increases in diameter and compressively engages the wall of the bore in support 10 and the zone of race 13 which it confronts. The ends of the element 21 may then be cut off at right angles to its length at points preferably somewhat outwardly of the ends of bores 20. The element 21, at such ends 24 thereof (FIG. 1) are of greater diameter than the bore 20, and thus aid materially in retaining the elements in place in the bores, despite limited axis movement between race 13 and support 10.

Although passages 20 are shown and described as being generally round in section, they may be of various other shapes such as square, rectangular, or triangular, and may be made by milling, slotting, or broaching methods. The elastomeric elements may also be made with sections of various relaxed shapes which may be different from the section of the passage, so long as the elements when installed are under substantial compression and at least substantially fill the passage.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art. For example, the bearing retaining mechanism of the invention may be employed between the shaft portion 16 and the inner race 14 of the bearing instead of in the manner shown, or it may be used in both such manners in the same bearing having inner and outer races. If desired, a groove 20' for resilient strip 21 may be formed in the race of the bearing and when a plurality of strips 21 are employed, some may be mounted in the race and some in the support. It will be seen that the strip or strips 21 may be installed in grooves or bores 20 and 20' in stretched, reduced diameter condition either before or after the bearing is installed in the support.

What is claimed is:

1. In combination, an annular bearing member, support means comprising a supporting member for said bearing member, one of said members having at least one axially extending groove in the surface thereof forming a substantially cylindrical passage between confronting surfaces of said members, said groove having the open side thereof in the form of an axially extending slot in the surface of said one member adjacent the confronting surface of the other of said members, the width of said slot being less than the diameter of said passage, and an elongated cylindrical resilient element of elastomeric material with a relaxed diameter appreciably greater than the diameter of said passage filling the latter and exerting a radial pressure against the surface of said other member through said slot, whereby said element is under longitudinal tension within the passage and said members are frictionally restrained against relative rotation.

2. A combination as defined in claim 1, wherein said passage is open at both ends.

3. A combination as defined in claim 2, wherein relaxed portions of the resilient element project from both ends of said passage.

4. In apparatus of the class described, a supporting member having a bearing receiving opening, an annular bearing member positioned in said opening, one of said members having at least one axially extending groove in the surface thereof which engages the surface of the other of said members, said groove being open-faced in the direction of said other member and forming a substantially cylindrical passage between adjacent surfaces of said members, the open face of the groove forming a slot of less width than the diameter of the passage, and an elongated element of resilient rubber-like material having a relaxed diameter appreciably greater than the diameter of said passage filling the latter and exerting a radial force against the surface of said other member through the open face of said groove to yieldably restrain said members against relative rotation, said element being under longitudinal tension within said passage.

5. Apparatus as defined in claim 4, wherein said groove is in the surface of the opening of said supporting member.

6. Apparatus as defined in claim 4, wherein said groove is in the surface of said bearing member.

References Cited in the file of this patent

UNITED STATES PATENTS

| | | |
|---|---|---|
| 2,362,938 | Short | Nov. 14, 1944 |
| 2,469,483 | Strong | May 10, 1949 |
| 2,649,337 | Ware | Aug. 18, 1953 |

FOREIGN PATENTS

| | | |
|---|---|---|
| 707,588 | Great Britain | Apr. 21, 1954 |